(12) United States Patent
Abdul Rahman et al.

(10) Patent No.: US 8,057,588 B2
(45) Date of Patent: Nov. 15, 2011

(54) FORMULATION FOR COATING MATERIAL

(75) Inventors: Mohd Basyaruddin Abdul Rahman, Serdang (MY); Noraini Abd. Ghani, Serdang (MY); Mahiran Basri, Serdang (MY); Abu Bakar Salleh, Serdang (MY); Raja Nor Zaliha Raja Abdul Rahman, Serdang (MY)

(73) Assignee: Universiti Putra Malaysia, Serdang (MY)

( * ) Notice: Subject to any disclaimer, the term of this patent is extended or adjusted under 35 U.S.C. 154(b) by 0 days.

(21) Appl. No.: 12/515,373

(22) PCT Filed: Sep. 3, 2008

(86) PCT No.: PCT/MY2008/000094
§ 371 (c)(1),
(2), (4) Date: Mar. 11, 2010

(87) PCT Pub. No.: WO2009/066976
PCT Pub. Date: May 28, 2009

(65) Prior Publication Data
US 2010/0186628 A1 Jul. 29, 2010

(30) Foreign Application Priority Data
Nov. 23, 2007 (MY) .............................. PI 20072081

(51) Int. Cl.
*C09D 191/06* (2006.01)
*C09D 163/10* (2006.01)
*A01N 25/00* (2006.01)
(52) U.S. Cl. .................. 106/18.29; 424/78.09; 424/405
(58) Field of Classification Search ............... 106/18.29; 424/78.09, 405
See application file for complete search history.

(56) References Cited

U.S. PATENT DOCUMENTS

| | | |
|---|---|---|
| 6,596,519 B2 | 7/2003 | Takayanagi et al. |
| 2003/0036604 A1 | 2/2003 | Meisenburg et al. |
| 2006/0228481 A1 | 10/2006 | Gros et al. |
| 2007/0122728 A1 | 5/2007 | Vanbesien et al. |
| 2007/0142492 A1 | 6/2007 | Odell et al. |
| 2007/0187947 A1 | 8/2007 | Heeschen |

OTHER PUBLICATIONS

International Search Report dated Nov. 7, 2008 to corresponding international application No. PCT/MY2008/000094, 4 pages.

*Primary Examiner* — Anthony Green
(74) *Attorney, Agent, or Firm* — Maier & Maier, PLLC

(57) ABSTRACT

The present invention relates to a Solvent-free coating material and treating agents used as wood coating material as a protective agent. The wood coating material is used to provide a short period of time ultra-violet (UV) radiation curing. Furthermore the coating material relates to an anticorrosion formulation and a method for forming a coated panel. This invention also provides a low volatility and high scratch resistance of coating for wooden surfaces.

7 Claims, 3 Drawing Sheets

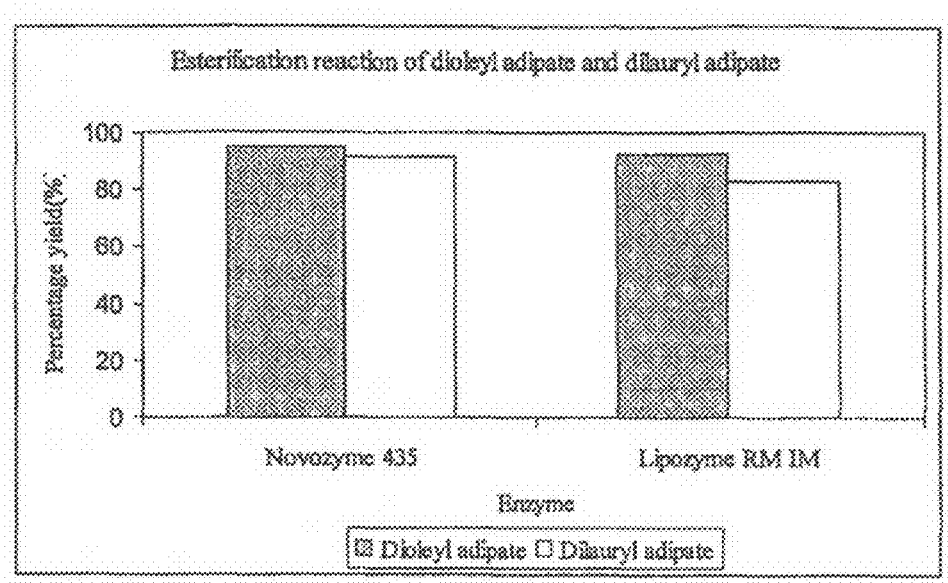
Figure 1: Percentage yield of wax esters produced by esterification reaction
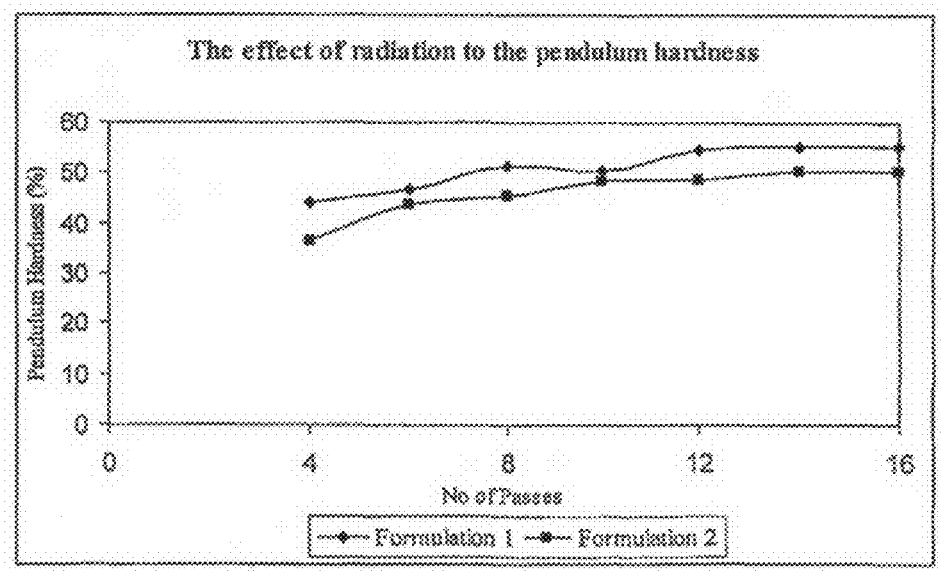
Figure 2: The effect of irradiation doses to the hardness of coatings cured by UV light.

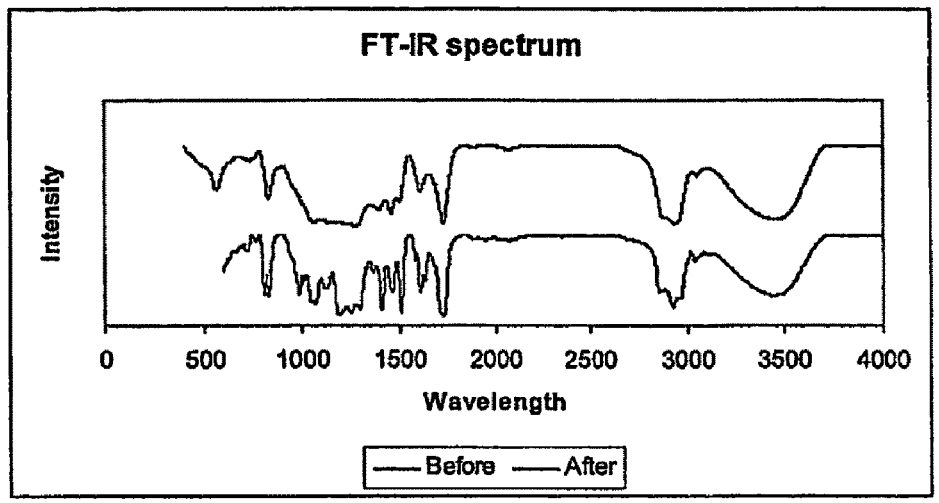
Figure 3: Spectrum obtained from Fourier Transform- Infrared (FT-IR) of coating composition before and after the radiation
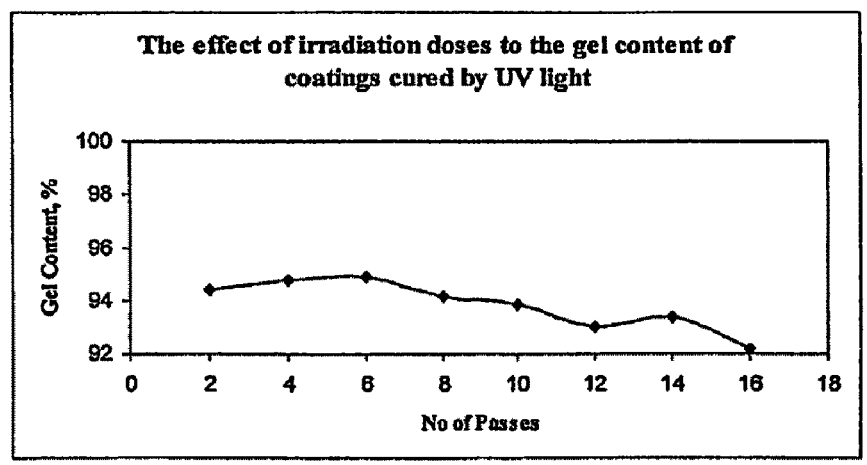
Figure 4: The effect of irradiation doses to the gel content of coatings cured by UV light

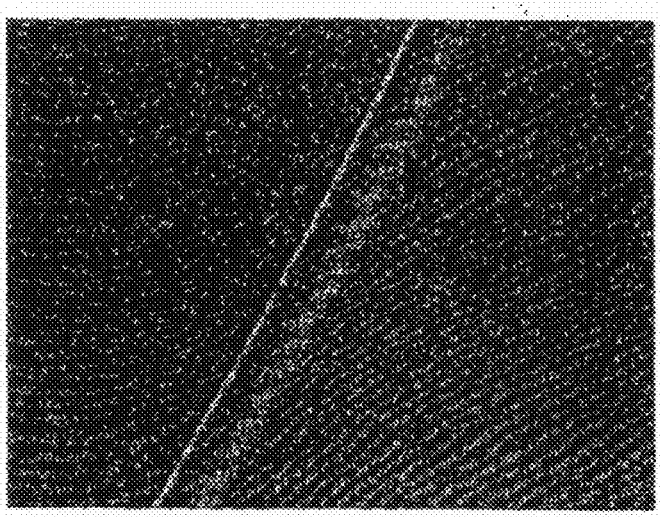
Figure 5: Clear circle line at glass tiles surface produced by scratch tester using 5 times magnification.
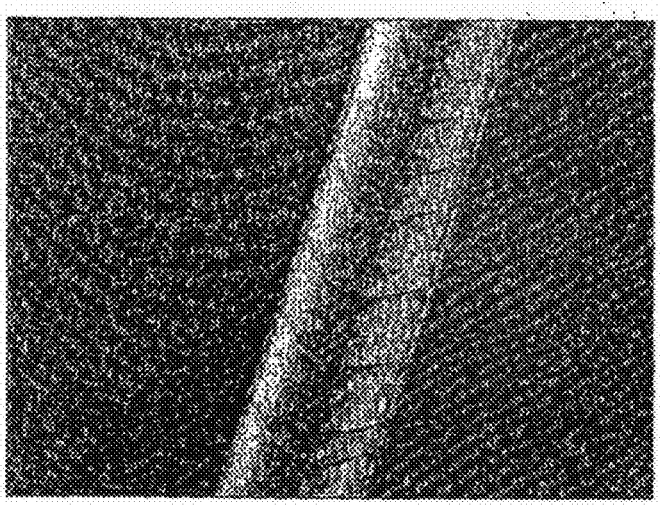
Figure 6: "Fishbone" at glass tiles surface produced by scratch tester using 10 times magnification.

FORMULATION FOR COATING MATERIAL

RELATED APPLICATIONS

This application claims priority, under 35 U.S.C. §119, to International Patent Application No.: PCT/MY2008/000094, filed on Sep. 3, 2008, which claims priority to Malaysian patent application No. PI 20072081, filed Nov. 23, 2007, the disclosures of which are incorporated by reference herein in their entireties.

FIELD OF THE INVENTION

The present invention relates to coating materials and treatment formulation for protecting wood against biological material destruction. The present invention also relates to a process for preparing the coating materials and treatment formulation.

BACKGROUND OF THE INVENTION

It is known about the existence on the market of a large number of coatings for external applications on a woody support. In particular in recent years, in order to reduce the emission of volatile organic substances into the environment, a series of water-based products has been developed. A group of water-based coatings for applications on wood consists of transparent coatings for external use.

It is known that the woody support and the coating undergo degradation phenomena due to atmospheric agents such as for instance solar radiation, in particular the ultraviolet component of solar radiation; heat; environment temperature; liquid humidity (rain) or gas humidity (atmospheric humidity). Moreover, it is known that a woody support exposed to sunlight undergoes a degradation process. In practice, the exposed surface takes on a gray color due to lignin degradation, which results in a higher wood porosity, a loss of structural firmness and a higher absorption of environment humidity. Such degradation involves an increase of phenomena of dimensional variation, which can be seen as surface splits. Splits or clefts make water absorption easier, which eventually results in a dark brown color and degrades little by little wood internal structure.

The increase of relative humidity favors the formation of colonies of moulds or fungi. The degradation of the woody support and of the coating, for instance a transparent coating, involves decay in the external appearance of the coated manufactured item. Once the shielding action of the coating film is over, the degradation speed of the woody support gets higher. The practical result of this degradation is an unpleasant appearance of the coated manufactured item.

In addition, a structural decay of wood takes place, due to a subsequent splitting of the wood surface. Wood then rots because of fungi and moulds, which results in a loss of dimensional stability of the material used to build for instance an external window.

Radiation curing is an attractive option for quality wood finishers. Not only does this technology assure compliance with volatile organic compounds (VOCs) and hazardous air pollutants (HAPS) environmental mandates, it is one of the most cost-effective methods for creating a premium finish that will leave a lasting impression on customers. Wooden materials can be protected from adverse factors such as visible light, UV-light, oxygen, heat, humidity and water, biological attack and air pollutants, using various protective and decorative finishes such as paints, transparent stains and penetrating finishes or film forming clear varnishes. Transparent systems that allow the natural features of the wood (color and texture) to remain visible are attracting interest and the demand for them has been increasing.

Wood is widely use as a natural raw material in construction, furniture industry and for parquetry end uses. Its physical properties and its warm appearance distinguish it in many areas from competitive materials such as concrete, metals and plastics. Coatings (paints, varnishes and lacquers) are an essential part of the majority of products based on wood-based materials. Consumer and industrial desire for more environmentally benign coatings is growing rapidly. The conventional use of acrylate ester in formulation gave low scratch resistance for wooden surfaces.

Furthermore, acrylate ester is considered a strong eye and skin irritant. Thus, industry continues to look for ways to provide coating compositions that provide better performance yet environmental friendly in the workplace.

At present, only formulations of radiation coating containing oligomers and monomers from acrylate ester have been studied (Kumar et al., 2006; Bajpai et al., 2002). However, the acrylate ester is hazardous and toxic. Therefore the need to study new radiation coating formulation from adipate ester is very important due to the fact of green technology production.

The objective of the present invention provides a formulation for a coating material wherein the coating material includes wax esters as ingredients in coating for wooden surfaces with minimum pollutants. This invention also offers a comprehensive approach to this new technology, designed to ensure that the right application components and coating systems are selected for higher throughput, lower cycle time and maximum UV efficiency. The formulation for the coating material on wooden surfaces is preferably solvent free and consists of wax ester (adipate ester and palm-based wax esters), epoxy acrylate, surfactant, hardener and photoinitiator. In general, wax esters make attractive starting materials for wood coatings, because they are safer, healthier and pleasant to use. Wax esters was tested in the industrial wood coating, which may produce and improve surfaces resistant to water, less to fat stains, highlighting the natural character of wood, long lasting and hardwearing.

Adipate esters are widely used due to their relatively low cost and good balance of properties. Simple dialkyl adipates are made by reacting adipic acid or its dimethyl ester with monohydric alcohols (Gryglewicz, 2001). Suitable fatty acids for the usage in preparing fatty esters are palm oil, palm kernel oil, palm olein and palm stearin. The uses of wax esters are attractive since there are non-hazardous compounds with good biodegradability. Most of today's commercial enzymatic processes have a variety of positive characteristics, such as high productivity and a lack of undesirable by-product. There is a strong attention in developing waxes to serve as ingredients in coatings for wooden surfaces, with minimum pollutants and with substrates from renewable resources. The conventional extractions of wax esters from plant materials and direct biosynthesis by fermentation are the two methods for organic esters synthesis.

However, these methods exhibit a high cost of processing and low yields of desired esters and therefore, better processes need to be developed and to cater the environmental benign processes. Chemical routes have to attend problems such as poor reaction selectivity and extreme reaction condition leading to undesirable side reactions, low yields, pollution and high cost of manufacturing. As an alternative, the use of lipases to catalyze these synthesis reactions has recently become a much more promising method (Rejassa, et al., 2003). Lipase-catalyzed reactions are superior to conventional chemical methods owing to mild reaction conditions, high catalytic efficiency and the inherent selectivity of the natural catalysts which results in much purer products. In recent years, enzymatic catalyzed reaction has been widely understood and able to produce a highly pure product at mild temperature and atmospheric pressure (Abdul Rahman et al., 2003).

SUMMARY OF THE INVENTION

Accordingly, the object of the invention relates to a coating formulation for protecting wood against biological material destruction. The formulation includes a) wax esters and/or, b) epoxy acrylate and/or, c) surfactant and/or, d) hardener and/or, e) photoinitiator. The formulation comprises (i) between 60% and 85% of epoxy acrylate, (ii) between 7% and 12% of wax esters, (iii) between 8% and 9% of hardener, (iv) between 4% and 5% of surfactant and (v) between 2% and 3% of photoinitiator. Further to that, the wax ester in the present invention includes adipate esters or palm based wax esters. In addition, the coating formulation for protecting wood further includes a) agents that protect the coating formulation against UV light, (b) agents that protect the coating formulation against aging, (c) colorants, (d) decorative agents, (e) agents that promote adhesion for the rest of the coating material or coating formulation, (f) hydrophobicization agents; and (v) water.

In addition the present invention further relates to a process for preparing the coating formulation whereby the process represents the followings: (a) mixing wax esters with epoxy acrylate to form a mixture, (b) adding surfactant[preferably Brij, Span and Tween] into the mixture from step (a), (c) adding harder into the mixture from (a), (d) stirring the mixture from step (c) for at least 30 min to obtain a homogeneous mixture, (f) mixing the homogeneous mixture from step (d) with photoinitiator, (g) obtaining a coating material or treatment formulation from step (a) to (f). The adipate esters used in the invention includes dioleyl adipate or dilauryl adipate and the palm based wax esters includes palm oil ester, palm kernel ester, palm olein ester. In addition, The wax esters is prepared by means of enzymatic synthesis.

Accordingly, the present invention also provides the use of the formulation for the manufacture of a coating material, wherein the coating material includes the following properties (a) high gel content, (b) high scratch resistance and (c) high pendulum hardness. The invention is a new product which relates to a solvent free wood coating formulation contains adipate ester that can cure in a short period of time under ultra-violet (UV) radiation curing. More particularly, this invention relates to low volatility and high scratch resistance of coating for wooden surfaces. The previous invention usually used solvent wood coating composition which vaporized and caused air pollutants. Furthermore, the conventional wood coating formulation gave low scratch resistance and good protection for wooden surfaces. The invention is suitable for producing a wood coated substrate having a cured topcoat or seal coat. The wood coating formulation gave clear coating which will expose wood's aesthetic properties and its warm appearance distinguish it in many areas from competitive materials such as concrete, metals and plastics.

BRIEF DESCRIPTION OF THE DRAWINGS

FIG. 1 represents percentage yield of wax esters produced by esterification reaction.

FIG. 2 represents the effect of irradiation doses to the hardness of coatings cured by UV light.

FIG. 3 represents spectrum obtained from Fourier Transform-Infrared (FT-IR) of coating composition before and after the radiation.

FIG. 4 represents the effect of irradiation doses to the gel content of coatings cured by UV light.

FIG. 5 represents clear circle line at glass tiles surface produced by scratch tester using 5 times magnification.

FIG. 6 represents "Fishbone" at glass tiles surface produced by scratch tester using 10 times magnification.

DETAILED DESCRIPTION OF THE INVENTION

The invention will now be described in more detail by reference to the following Figures and Examples. The following examples are provided for illustrative purposes only and are not intended to limit the invention.

The inventors in the present invention established a treatment formulation or a coating formulation for manufacturing a coating material for wood or on wooden surfaces. The formulation enhances scratch resistance and pendulum hardness properties.

The formulation of the present invention can be used in applications commonly served by products conventionally identified as varnishes, lacquers and paints. The treatment formulation or coating material in the present invention cures wooden surface preferably in the presence of photoinititor, to initiate the crosslinking polymerization. The formulation of the invention cures rapidly and it forms a film with improved physical properties including good scratch resistance and high gloss.

As noted, the formulation in the present invention essentially consists of materials such as wax ester (adipate ester and palm-based wax esters), epoxy acrylate, surfactant, hardener and photoinitiator. The materials used co-react at the time of mixing the materials to form a coating mixture. The first component in the formulation includes wax esters derived from adipic acid or palm-based by the enzymatic esterification of adipic acid or fatty acids with fatty alcohols. The reaction of adipic acid with fatty acids was done in optimum conditions which are 50° C. and 150 rpm shaking speed with incubated for 30 minutes and catalyzed by lipase, Novozyme 435. Meanwhile, the esterification of fatty acids and fatty alcohols were done in batch reactor scale according to U.S. Pat. No. 192,452.

In addition, the formulation obtained was cured by UV radiation technique. The technique is based on the polymerization of a multifunctional system induce by an incident UV radiation to obtain a three-dimensional network. The reaction allows transforming of liquid system into a non-tacky solid matrix having rubbery or glassy properties at room temperature. Beside UV radiation technique, the formulation was also cured by different technique, which is EB curing. This technique is mainly used for acrylate formulations. As in the case of photoinitiation, the electron-initiated polymerisation of acrylates proceeds via free radicals. After the electron irradiation of liquid acrylates radicals are generated, which initiate polymerisation and form reactive sites for cross-linking. Typical irradiation doses of 10 to 50 kGy are needed to transform liquid acrylates into dense polymer networks. FIG. 1 shows the percentage yield of selected esterification reaction of adipate ester which is dioleyl adipate and dilauryl adipate. Esterification of oleyl alcohol and adipate acid gave 95.0091% of dioleyl adipate, whereas esterification reaction of dilauryl adipate from lauryl alcohol and adipic acid gave 91.5824% using Novozyme 435 as biocatalyst. The esterification of adipic acid and various alcohols using optimization condition gave higher percentage yield, which is more than 90%. From the result, we know that immobilized enzyme Novozyme 435 is the best enzyme in synthesis of wax ester rather than using Lipozyme RM IM. This present invention was used the wax esters in formulation for wood coating.

The experiment was carried out with mixture of 10:90 ratio wax ester: epoxy acrylate in addition with surfactant. The surfactants that were used are series of Brij (30 and 93), Span (20 and 40) and Tween (20, 40, 60, 80 and 85). The preferred surfactant is Brij 30 which can produced homogeneous mixture. A stirrer Ika Werke RW 16 were used in mixing the epoxy acrylate and adipate esters with addition of Brij 30 for 30 minutes. Table 1 show the materials of formulations which are judiciously chosen. Thus the characteristics of the present invention should further enhance. The coating composition formulation was applied onto glass tiles with specific thickness (150 μm) using bar coater. Later, coated glass tiles were irradiated by IST 1-UV Dryer. Each passes gave energy 0.95 J/cm$^2$. The glass tiles were used instead of wood because of further test was carried out which is gel content, pendulum hardness and scratch resistance. Pendulum hardness test was used to measure the hardness of a coating. The hardness of a coated sample was compared relatively with the hardness of a standard glass plate.

FIG. 2 is a graph showing the hardness percentage of polymerization. Every single pass under ultraviolet light brings chemical and physical changes to coatings. Depends on type of radiation, every pass increased their pendulum hardness values and subsequently gel content. These values will reach the maximum until degradation takes place. This was done in order to find the optimum dosage to cure the formulations. From the result, Formulation 1 has higher hardness compare to Formulation 1.

FIG. 3 is a typical spectra obtained from Fourier Transform-Infrared (FT-IR) of coating composition before and after the radiation. This analysis of coated film was done to confirm the polymerization or degradation which affected the hardness. The absence of spectrum at 1634 cm$^{-1}$ was confirmed the polymerization completed.

Soxhlet extractor was used to remove un-reacted materials inside a coating film, leaving behind the cured polymeric film. The remaining residue is the gel content of the film. Higher gel content means more crosslinking took place. The cured films of known weight were extracted for 10 hours in acetone using soxhlet extractor.

The films after extraction were dried in vacuum and weighted to estimate gel fraction. Gel content estimation is an important property of any coating, as it is directly measure the degree of crosslinking, which will decides the final properties of coating. The crosslinked material will not be removed by solvent extraction. Many passes under ultraviolet light will produce more crosslinking and consequently higher gel content.

FIG. 4 is a graph showing a gel content percentage for coating formulation. From the result, percentage gel content is more than 90% for all the number of passes. Thus the FT-IR analysis was used to support the curing estimation. Nevertheless, six passes was chosen as an optimization passes which give the highest gel content percentage. Number of passes was affected the UV intensity, thus high intensity will increase the risk of over curing and consequently degradation to the cured films (Mahmood et al., 2001). The scratch resistance of a coating film was measured by Erichsen Scratch Tester to determine the maximum load at which the coating will be penetrated. The coatings were cured on glass tiles. Diamond tip angle at 90° was used as a needle tip. The load can be varied from 0.5 N to 10 N. The needle tip was used to scratch the surface of the cured coatings on the glass tiles.

FIGS. 5 and 6 are images of circle line produced by scratch tester. The scratch will produce a clear circle line (FIG. 5) which needs to increase the load. The last load that produces discontinuous line (FIG. 6) was a limitation for maximum load. The scratch mark also known as "fishbone". Thus, the load before "fishbone" pattern occurred was recorded as maximum scratch resistance. Olympus BH2-UMA microscope was used to analyze the scratch marks on coating produced by the scratch tester. Using microscope, we will be able to detect the formation of "fishbone" on the coatings. Among the mechanical properties required for a coating to fulfill its protective role, scratch resistance is one of the most important one. The damage caused by scratch on cured surface may be simple that causes change in the glossy look of coating or it may be as severe that may cause deformation and finally induced crack of coating (Kumar et al., 2006).

Table 2 shows scratch resistance of coating composition. Formulation 1 gave higher scratch resistance compared to Formulation 2. The maximum load for Formulation 1 is 4.5N in 8 numbers of passes. Previously, Salleh and co-workers (2002) have studied the scratch resistance of the polymeric composites in development of hard material by radiation coating. Though, the maximum load can resist only up to 3.0N, lower compared to this invention.

TABLE 1

Preferred materials used for the coating formulation.

| | Percentages (%) | |
|---|---|---|
| Materials | Formulation 1 | Formulation 2 |
| Epoxy acrylate (EB 600) | 76.3 | 76.3 |
| Dioleyl adipate | 8.5 | — |
| Dilauryl adipate | — | 8.5 |
| PETIA | 8.5 | 8.5 |
| Brij 30 | 4.2 | 4.2 |
| 2-Hydroxy-2-methyl-1-phenyl-propan-1-one (Darocur 1173) | 2.5 | 2.5 |

TABLE 2

Scratch resistance of the surface coatings with film thickness of 150 μm

| | Diamond Tip, 90° | |
|---|---|---|
| No of Passes | Formulation 1 | Formulation 2 |
| 4× | 3.5 N | 2.5 N |
| 6× | 4.0 N | 3.0 N |
| 8× | 4.5 N | 3.0 N |
| 10× | 4.5 N | 3.0 N |
| 12× | 4.5 N | 3.5 N |
| 14× | 4.0 N | 3.5 N |

Example 1

Coating formulation was carried out on a laboratory scale. Epoxy acrylate (45.0 g), dioleyl adipate (5.0 g), surfactant (5.0 g) and hardener (6.111 g) were mixed using Ika Werke RW16 for 30 minutes to get homogeneous mixture. After this, the formulation was mixed with photoinitiator (1.5 g). The complete formulation was applied onto a glass tiles using bar coater with 150 μm thickness. Later, the coated glass tiles were irradiated using IST 1-UV Dryer. Each passes gave energy 0.95 J/cm$^2$.

Product before and after radiation was analyzed using FT-IR. The absence of spectrum at 1634 cm$^{-1}$ after radiation was confirmed the polymerization completed. Physical characterization of coated glass was analyzed using Byk Pendulum Hardness Tester and Erichsen Scratch Tester for hardness and scratch resistance. Later, the film was removed and soxhlet extraction was carried out for gel content measurement. The gel content exhibit more than 90% polymerization, while the pendulum hardness gave 55.25% of hardness.

Both of these analyses are significant to determine the effect of irradiation passes. The highest weight loaded can resist by the wax esters formulation is 4.5 N in scratch test.

DEFINITIONS

Formulation is the process of devising a formula for a product which is deciding quantities of substrate should be added in sequence and processing steps should be taken to provide the final product. The next ingredient for the present invention is surfactant as an emulsifier to get homogenous mixture.

Surfactants are wetting agent that lower the surface tension of a liquid, allowing easier spreading, and lower the interfacial tension between two liquids. It is usually organic compounds that are amphiphilic, meaning they contain both hydrophobic groups and hydrophilic groups.

The invention claimed is:

1. A coating formulation for protecting wood against biological material destruction, the formulation comprises:
   a) between 8% and 12% of wax esters, the wax esters comprising adipate esters;
   b) between 60% and 80% of epoxy acrylate;
   c) between 8% and 9% of hardener, wherein the hardener is pentaerythritoltriacrylate (PETIA);
   d) between 2% and 3% of photoinitiator, wherein the photoinitiator is 2-Hydroxy-2-methyl-1-phenyl-propan-1-one; and
   e) between 4% and 5% of additives comprising surfactant, agents that protect the coating formulation against UV light, agents that protect the coating formulation against aging, colorants, decorative agents, agents that promote adhesion for the rest of the coating material or coating formulation, hydrophobicization agents and water.

2. The coating formulation for protecting wood as claimed in claim 1, wherein the wax esters further comprises palm based wax esters.

3. A process for preparing a coating formulation for protecting wood against biological material destruction, the formulation includes between 8% and 12% of wax esters, the wax esters comprising adipate esters, between 60% and 80% of epoxy acrylate, between 8% and 9% of hardener, wherein the hardener is pentaerythritoltriacrylate (PETIA), between 2% and 3% of photoinitiator, wherein the photoinitiator is 2-Hydroxy-2-methyl-1-phenyl-propan-1-one, and between 4% and 5% of additives comprising surfactant, agents that protect the coating formulation against UV light, agents that protect the coating formulation against aging, colorants, decorative agents, agents that promote adhesion for the rest of the coating material or coating formulation, hydrophobicization agents and water, the process comprises the steps of:
   (a) mixing the wax esters with the epoxy acrylate to form a mixture;
   (b) adding the additives into the mixture from step (a);
   (c) adding the hardener into the mixture from step (b);
   (d) stirring the mixture from step (c) for at least 30 minutes to obtain a homogenous mixture, and
   (e) mixing the homogenous mixture from step (d) with the photoinitiator.

4. The process as claimed in claim 3, wherein the wax esters further comprises palm based wax esters.

5. The process as claimed in claim 3, wherein the adipate esters comprises dioleyl adipate or dilauryl adipate.

6. The process as claimed in claim 5, wherein the adipate esters are prepared by means of enzymatic synthesis.

7. The process as claimed in claim 4, wherein the palm based wax esters comprises palm oil ester, palm kernel ester and palm olein ester.

* * * * *